US010182578B2

(12) United States Patent
Wang et al.

(10) Patent No.: US 10,182,578 B2
(45) Date of Patent: Jan. 22, 2019

(54) SAUSAGE STUFFER

(71) Applicant: Forcome (Qingdao) Co., Ltd., Huangdao District, Qingdao (CN)

(72) Inventors: Gang Wang, Qingdao (CN); Yandi Wang, Qingdao (CN)

(73) Assignee: FORCOME (QINGDAO) CO., LTD. (CN)

( * ) Notice: Subject to any disclaimer, the term of this patent is extended or adjusted under 35 U.S.C. 154(b) by 0 days.

(21) Appl. No.: 16/004,810

(22) Filed: Jun. 11, 2018

(65) Prior Publication Data

US 2018/0352821 A1    Dec. 13, 2018

(30) Foreign Application Priority Data

Jun. 9, 2017  (CN) .................. 2017 2 20667100 U

(51) Int. Cl.
*A22C 11/00* (2006.01)
*A22C 11/02* (2006.01)
*A22C 11/04* (2006.01)

(52) U.S. Cl.
CPC .......... *A22C 11/0245* (2013.01); *A22C 11/04* (2013.01)

(58) Field of Classification Search
CPC ....... A22C 11/00; A22C 11/001; A22C 11/02; A22C 11/0209; A22C 11/04
USPC ........................ 452/30–32, 35–37, 46–48, 51
See application file for complete search history.

(56) References Cited

U.S. PATENT DOCUMENTS

| | | | | |
|---|---|---|---|---|
| 6,524,177 B2 * | 2/2003 | Bolzacchini | ........... | A22C 11/02 452/22 |
| 6,964,605 B2 * | 11/2005 | Kasai | ................. | A22C 11/0245 452/32 |
| 7,455,577 B2 * | 11/2008 | Topfer | ............... | A22C 11/0263 452/30 |
| 7,520,801 B2 * | 4/2009 | Epstein | ................ | A22C 7/0023 452/30 |
| 7,704,129 B2 * | 4/2010 | May | ....................... | A22C 13/02 452/32 |
| 7,775,859 B2 * | 8/2010 | May | .......................... | B65B 1/04 452/30 |

* cited by examiner

*Primary Examiner* — Richard T Price, Jr.
(74) *Attorney, Agent, or Firm* — Calfee, Halter & Griswold LLP

(57) ABSTRACT

The present application discloses a speed-adjustable automatic limiting sausage stuffer. The sausage stuffer includes a rack and photoelectric sensors. A first limiting sensing hole is disposed on the top end of the rack, a second limiting sensing hole is disposed on the middle of the rack, and a perpendicular distance between the first limiting sensing hole and the second limiting sensing hole is a height of a barrel. The photoelectric sensors are disposed symmetrically on two sides of the rack, and when the first limiting sensing hole or the second limiting sensing hole on the rack is located on a same plane as the photoelectric sensors, the symmetrically disposed photoelectric sensors and the first limiting sensing hole or the second limiting sensing hole lie on a single straight line.

12 Claims, 5 Drawing Sheets

SAUSAGE STUFFER

CROSS-REFERENCE TO RELATED APPLICATIONS

This application claims priority to Chinese Patent Application No. 201720667100.9, filed on Jun. 9, 2017, which is hereby incorporated by reference in its entirety.

TECHNICAL FIELD

The present application relates to the field of sausage stuffers, and in particular to a speed-adjustable sausage stuffer that can be operated both manually and automatically while enabling automatic limiting.

BACKGROUND ART

The finished sausage products can be obtained by sausage stuffing that particularly includes smashing, seasoning and stuffing salted or unsalted meat into a casing and subsequently poaching (sometimes smoking to a certain extent) the casing. The sausage stuffers have found widespread applications in stuffing of a wide variety of sausage products. After the working pressure of a sausage stuffer is properly regulated, those materials inside the barrel of the sausage stuffer are squeezed out, so that the delicate, coarsely-grained, or minced materials are stuffed into casings through a filling mouth and thus, meat products in manifold forms are produced, such as sausages, cold pork sausages, black puddings, etc. The current sausage stuffers that are commercially available are classified into two categories: manually-operated sausage stuffers and electrically-operated sausage stuffers. It is labor-consuming to operate those manually-operated sausage stuffers in case of high-capacity sausage stuffing, whereas for the electrically-operated ones, manual operation is required to control their working stroke, thereby making their automation become impossible and also leading to burdensome and inconvenient operations.

SUMMARY OF THE INVENTION

An object of the present application is to provide a speed-adjustable automatic limiting sausage stuffer, to solve problems that existing sausage stuffers on the market cannot be controlled completely automatically, but operated either manually or electrically, and that precision of automatic control is poor.

To achieve the foregoing object, the present application discloses a speed-adjustable automatic limiting sausage stuffer. The sausage stuffer includes a rack and photoelectric sensors;

a first limiting sensing hole is disposed on the top end of the rack and a second limiting sensing hole is disposed on the middle of the rack, a perpendicular distance between the first limiting sensing hole and the second limiting sensing hole is a height of a barrel; and the photoelectric sensors are disposed symmetrically on two sides of the rack, and when the first limiting sensing hole or the second limiting sensing hole on the rack is located on a same plane as the photoelectric sensors, the symmetrically disposed photoelectric sensors and the first limiting sensing hole or the second limiting sensing hole lie on a single straight line.

Further, the first limiting sensing hole is disposed in a thickness direction of the rack, and the second limiting sensing hole is disposed in a width direction of the rack; and the number of the photoelectric sensors is four, the photoelectric sensors are divided into two groups, the photoelectric sensors in one of the two groups are disposed symmetrically on the two sides of the rack in the width direction of the rack, and the photoelectric sensors in the other group are disposed symmetrically on the two sides of the rack in the thickness direction of the rack.

Further the sausage stuffer further includes a base, a housing, a support, and a gear set; and the housing includes a left side plate and a right side plate, the bottoms of the left side plate and the right side plate are separately fixed on the base, the support is fixed between the left side plate and the right side plate, the gear set is fixed on the housing and the support, the gear set engages with the rack, and the rack is mounted on the support.

Further, the sausage stuffer further includes a piston and a barrel;

the piston is fixed on a lower end of the rack, the piston is mounted within the barrel, the piston and the barrel are mounted in a sealing way therebetween; and the barrel is detachably disposed on inner wall faces of the left side plate and the right side plate.

Further, not less than one groove is formed on a side circumference of the piston, and an O-shaped ring is mounted within the groove.

Further, the gear set includes an input shaft; the input shaft includes a first gear shaft and a second gear shaft; and the first gear shaft is mounted on the support, with one end stretching out of the housing, and a first gear is disposed on the middle portion of the first gear shaft; the second gear shaft is parallel to the first gear shaft, and mounted on the support, with one end stretching out of the housing; a third gear is mounted on the second gear shaft; and the third gear engages with the first gear.

Further, the sausage stuffer further includes a driving device;

the driving device is connected with the input shaft of the gear set; and the driving device is a motor and/or hand crank.

Further, the motor is used for connecting with the first gear shaft;

the hand crank is used for connecting with the first gear shaft or the second gear shaft.

Further, the sausage stuffer further includes a main board and an overcurrent fault alarm device;

the overcurrent fault alarm device includes an overcurrent detection circuit and an overcurrent alarm buzzer; and the overcurrent detection circuit is separately connected with the motor and the main board; the overcurrent fault alarm buzzer is connected with the main board.

Further, the sausage stuffer further includes a speed-adjusting potentiometer, a signal processing circuit, and a speed adjusting circuit; and the speed-adjusting potentiometer is connected with the signal processing circuit, the signal processing circuit is connected to the main board, and the speed adjusting circuit is connected between the main board and the motor.

In the speed-adjustable automatic limiting sausage stuffer provided in the present application, speed adjustment can be performed according to production needs, high-precision automatic limiting at positions in a vertical direction can be implemented, switching between manual operation and automated operation can be implemented, and it is convenient to mount and clean the barrel.

Other features and advantages of the present application will be described in the following description, and will become partially apparent from the description, or be understood by implementing the present application. The object and other advantages of the present application can be realized and obtained through the structures specially indicated in the written description, claims and drawings.

BRIEF DESCRIPTION OF DRAWINGS

The drawings are merely intended to illustrate the purposes of the specific embodiments, rather than being considered as limitations to the present application. Throughout the drawings, same reference numerals denote same components.

Figure 1:
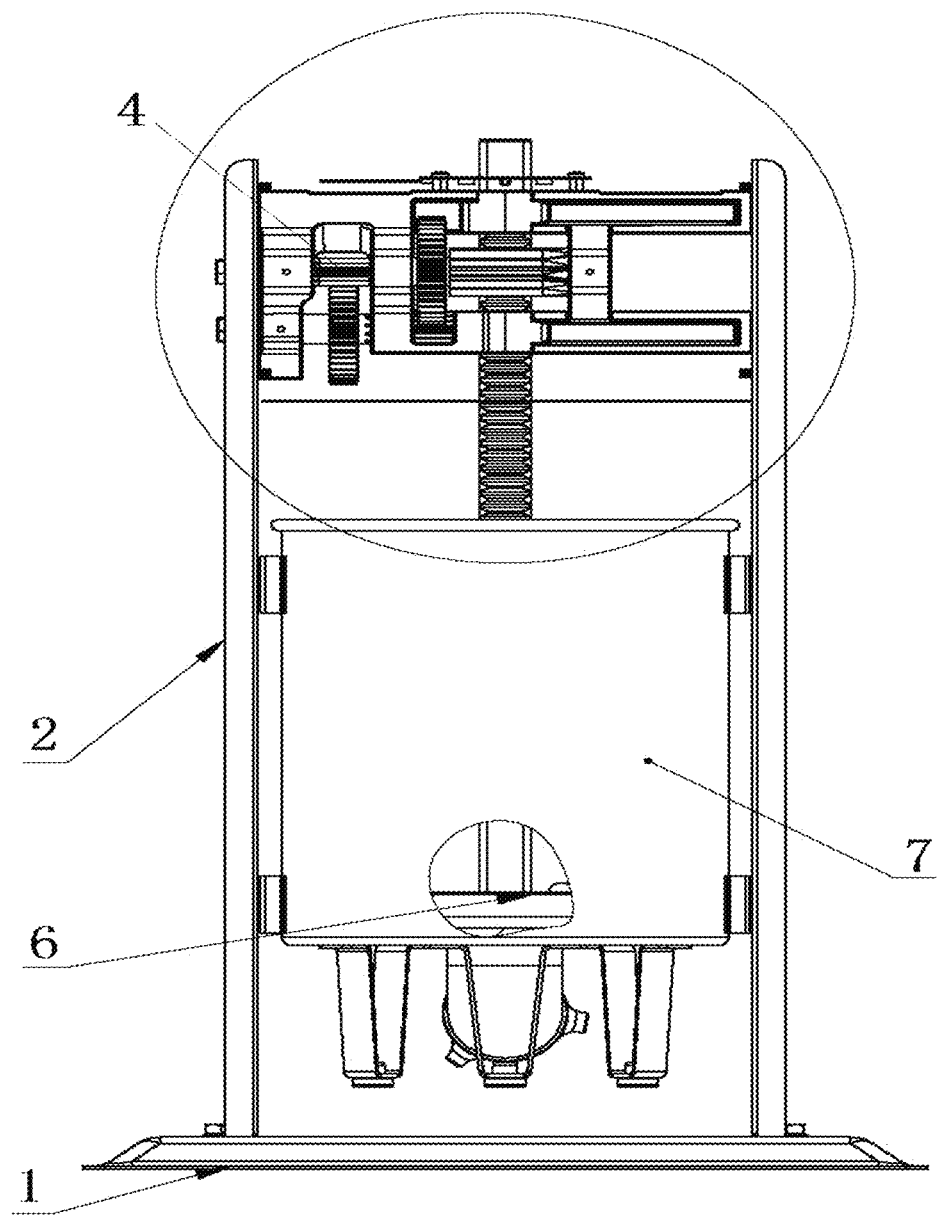
FIG. 1 is a schematic structure view of an entire sausage stuffer of the present application.

The reference numerals in the drawings are as follows:
1—base, 2—housing, 3—support, 4—gear set, 5—rack, 6—piston, 7—barrel, 8—photoelectric limiting circuit board;

301—first transverse section, 302—second transverse section, 303—first longitudinal section, 304—second longitudinal section, 305—third longitudinal section, 306—positioning hole, 307—first mounting hole, 308—second mounting hole, 309—third mounting hole, 310—fourth mounting hole;

41—first gear shaft, 42—second gear shaft, 43—third gear, 44—fourth gear, 45—fifth gear;

51—first limiting sensing hole, 52—second limiting sensing hole.

DETAILED DESCRIPTION OF THE INVENTION

The preferred embodiments of the present application will be described below in details by reference to the drawing. These drawings constitute a part of the present application, and are used, together with the embodiments of the present application, to explain the principle of the present application.

The present application discloses a speed-adjustable automatic limiting sausage stuffer. As shown in FIG. 1, the sausage stuffer includes a base 1, a housing 2, a support 3, a motor, a gear set 4, a rack 5, a piston 6, a barrel 7, a photoelectric limiting circuit board 8, an overcurrent fault alarm buzzer, and a hand crank.

Figure 2:
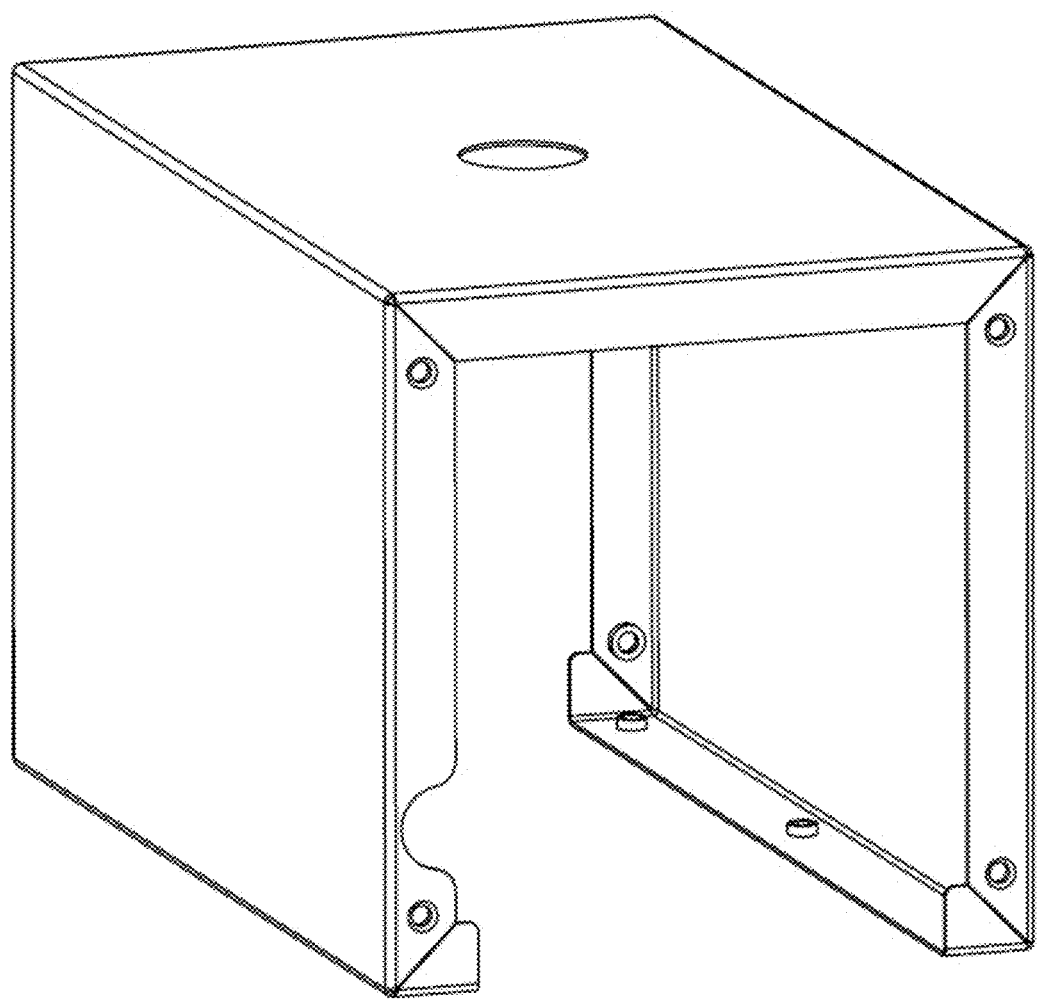
FIG. 2 is a schematic structure view of a top housing of the sausage stuffer of the present application.
Figure 3:
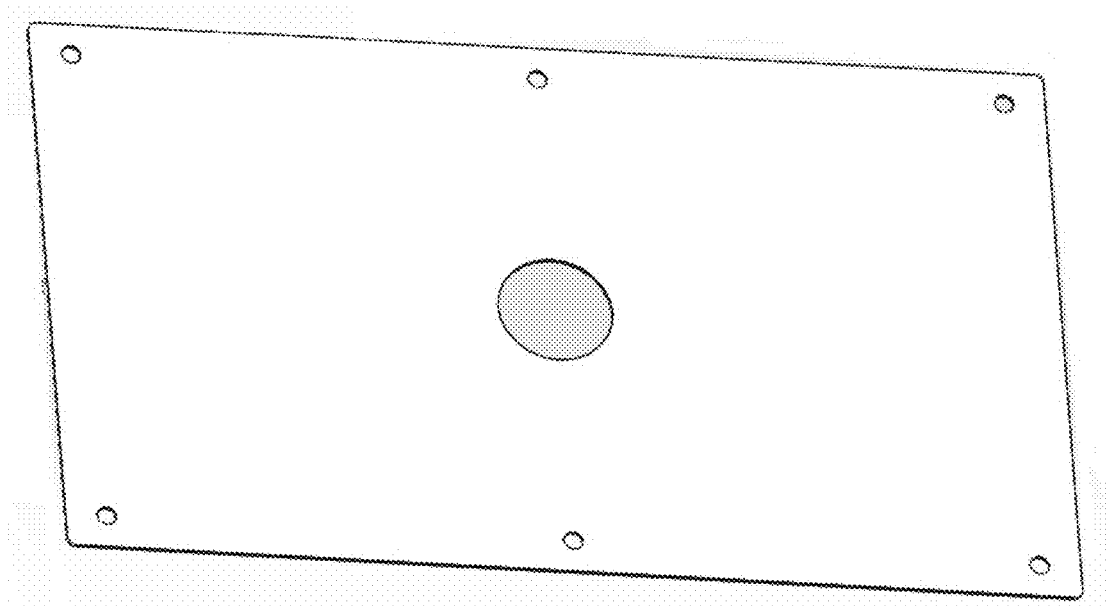
FIG. 3 is a schematic structure view of a bottom plate of the top housing of the sausage stuffer of the present application.

The housing 2 optionally includes a left side plate, a top housing, and a right side plate. The left side plate and the right side plate each have an L-shaped longitudinal section and include a transverse plate and a longitudinal plate that are integrally structured. The transverse plate is detachably fixed on the base by means of a screw, and the support 3 is disposed between the left side plate and the right side plate, and supports parts inside the housing 2. As shown in FIG. 2 and FIG. 3, a longitudinal section of the top housing is of a "□" structure. The top housing includes a front side plate, a rear side plate, a top plate, and a bottom plate, and is located between the left side plate and the right side plate, and is detachably fixed on the top ends of the left side plate and the right side plate by means of bolts. Heights of the front side plate and the rear side plate are 1/5 to 2/5 of heights of the left side plate or the right side plat. The top housing as well as the left side plate and the right side plate together form a cuboid-shaped closed space, to shield light.

In another embodiment of the present application, the housing 2 includes a left side plate, a front side plate, a rear side plate, a top plate and a right side plate, and either the front side plate or the rear side plate can be opened.

In this embodiment, the motor is fixed on the top end of an outer wall face of the left side plate of the housing 2, an output shaft of the motor is connected with the gear set 4, the gear set 4 is fixed on the housing 2 and the support 3, and the gear set 4 engages with the rack 5 to transfer the drive mode to the rack 5, allowing the rack 5 to move up and down. Optionally, the hand crank can be mounted on the outer wall face of the left side plate of the housing 2, the hand crank is connected with the gear set 4, and the gear set 4 is manually driven to rotate, allowing the rack 5 to move up and down. The positions on the top plate and the bottom plate, corresponding to the rack 5, are holed such that the rack 5 can move up and down without spatial limitations.

Figure 4:
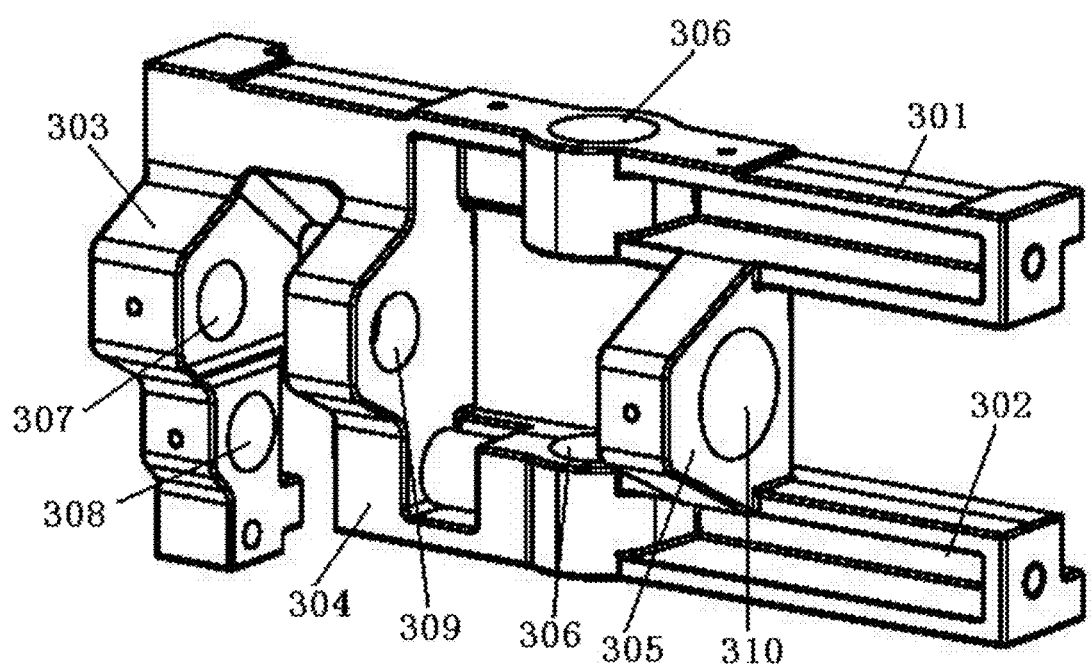
FIG. 4 is a schematic structure view of a support of the sausage stuffer of the present application.

As shown in FIG. 4, the support 3 includes a first transverse section 301, a second transverse section 302, a first longitudinal section 303, a second longitudinal section 304, and a third longitudinal section 305. The first transverse section 301 is parallel with the second transverse section 302, the second transverse section 302 has a length smaller than that of the first transverse section 301, the first transverse section 301 and the second transverse section 302 are connected with each other by means of the second longitudinal section 304 and the third longitudinal section 305, the first longitudinal section 303 is parallel with both the second longitudinal section 304 and the third longitudinal section 305, and the first longitudinal section 303 is fixed on one end of the first transverse section 301, but not in contact with the second transverse section 302. The first transverse section 301 and the second transverse section 302 have thereon positioning holes 306 for the passage of the rack, in order to restrict movement of the rack 5 in a horizontal direction. The first longitudinal section 303 has a first mounting hole 307 and a second mounting hole 308 thereon, the second longitudinal section 304 has a third mounting hole 309 thereon, and the third longitudinal section 305 has a fourth mounting hole 310 thereon. The first transverse section 301, the second transverse section 302 and the first longitudinal section 303 have thereon bolt holes that are utilized for fixing the support 3 onto the housing 2.

Figure 5:
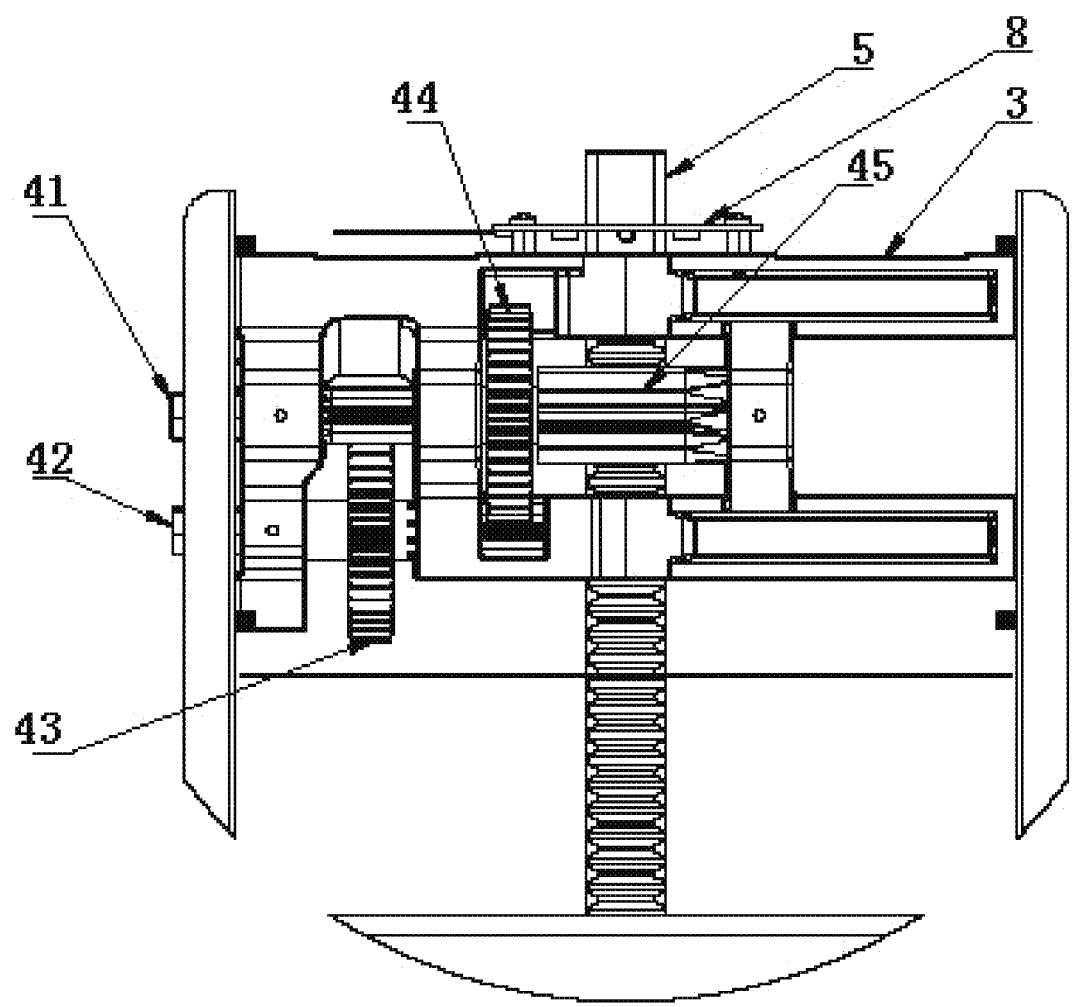
FIG. 5 is an enlarged view of a part of the sausage stuffer of the present application.

Optionally, as shown in FIG. 5, the gear set 4 includes a first gear shaft 41, a second gear shaft 42, a third gear 43, a fourth gear 44, and a fifth gear 45. The first gear shaft 41 and the second gear shaft 42 can both serve as input shafts. The first gear shaft 41 is shaft-like, the left end stretches out of the left side plate of the housing 2, the right end is mounted on the first mounting hole 307 of the support 3, and the middle portion is a first gear, the first gear and the first gear shaft 41 is integral. A bolt hole is formed on the support 3 between the first gear and the housing 2, a bolt passes through the bolt hole of the support 3 and is then screwed into an annular groove of the first gear shaft 41, to restrict axial movement of the first gear shaft 41. The output shaft of the motor can be connected with the leftmost end of the first gear shaft 41 to drive rotation of the first gear shaft 41. The second gear shaft 42 is shaft-like and mounted in parallel with the first gear shaft 41. The left end of the second gear shaft 42 stretches out of the left side plate of the housing 2, and the right end is mounted on the second mounting hole 308 of the support 3. A second gear is located near a position for mounting a bearing at the right end of the second gear shaft 42, and the second gear and the second gear shaft 42 are integral. The third gear 43 is mounted between the second gear and the left end of the second gear shaft 42 via a key joint. A bolt hole is formed on the support 3 between the third gear 43 and the housing 2, and a bolt passes through the bolt hole of the support 3 and is then screwed into an annular groove of the second gear shaft 42, to restrict axial movement of the second gear shaft 42. The third gear 43 engages with the first gear of the first gear shaft 41, the first gear drives the third gear 43 to rotate, and the third gear 43 and the second gear are mounted coaxially, so that the third gear 43 and the second gear have a same angular velocity. The fourth gear 44 and the fifth gear 45 are mounted on a same shaft, the shaft is mounted on the third mounting hole 309 and the fourth mounting hole 310 of the support 3, the fourth gear 44 engages with the integral gear of the second gear shaft 42, the second gear shaft 42 drives the fourth gear 44 to rotate, and the fourth gear 44 and the fifth gear 45 are mounted coaxially, so that the fourth gear and the fifth gear have a same angular velocity. The fifth gear 45 engages with the rack 5, to restrict movement of the rack 5 in a vertical direction, and the rack 5 can be driven to move up and down.

Figure 6:
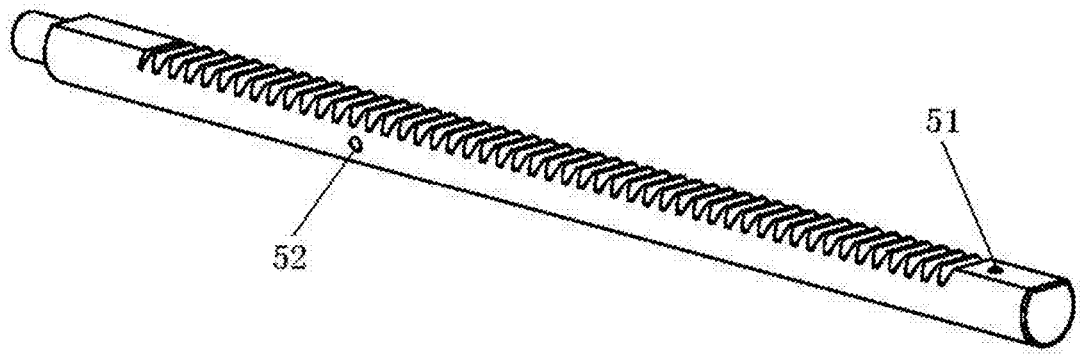
FIG. 6 is a schematic structure view of a rack of the sausage stuffer of the present application.

As shown in FIG. 6, the rack 5 is in the shape of a rod, has teeth for engagement on its surface, and is mounted on the support 3. The piston 6 is fixed on the lower end of the rack 5, the piston 6 is mounted within the barrel 7, the piston 6 and the barrel 7 are mounted in a sealing way therebetween, and the piston 6 can be driven by the rack 5 to move up and down along the barrel 7.

The piston 6 is cylindrical, and optionally, not less than one groove is formed on a cylindrical side circumference of the piston 6. An O-shaped ring is mounted within the groove, and the piston 6 and the barrel 7 are sealed by means of the O-shaped ring.

The barrel 7 is cylindrical that has an upper end as an open end and also has legs on the bottom face of its lower end face. The legs are fixed, by welding, on the lower surface of the bottom face of the barrel 7 and are structurally integrated with the barrel 7. An outlet for meat is formed on the lower end face of the barrel 7 and connected with a casing. A groove is formed on the side face of the barrel 7, a bulged hook or post is disposed on the inner wall faces of the left side plate and the right side plate of the housing 2, and the groove of the barrel 7 is matched with the hook or post of the housing 2, so that the barrel 7 can be hooked on the inner wall face of the housing 2, and can be taken down simply by tilting the barrel 7.

A first limiting sensing hole 51 is disposed on the top end of the rack 5 and a second limiting sensing hole 52 is disposed on the middle of the rack 5, a perpendicular distance between the first limiting sensing hole 51 and the second limiting sensing hole 52 is a height of the barrel 7, the first limiting sensing hole 51 on the top end is disposed in a thickness direction of the rack 5, and the second limiting sensing hole 52 on the middle is disposed in a width direction of the rack 5, namely an angle of 90 degrees is created between these two through holes. The photoelectric limiting circuit board 8 is fixed on the support 3 via a screw, and optionally is fixed on the top end of the support 3 and connected with an external control circuit. Photoelectric sensors are fixedly mounted on the photoelectric limiting circuit board 8, and there are exactly four photoelectric sensors, which are evenly disposed and divided into two groups, i.e. the photoelectric sensors in one of the two groups are symmetrically disposed on the two sides of the rack 5 in the width direction of the rack 5, and the photoelectric sensors in the other group are symmetrically disposed on the two sides of the rack 5 in the thickness direction of the rack 5. When the first limiting sensing hole 51 or the second limiting sensing hole 52 on the rack 5 is located on a same plane as the photoelectric sensors, two photoelectric sensors disposed symmetrically, together with the first limiting sensing hole 51 or the second limiting sensing hole 52, lie on a single straight line, and are used for sensing the position of the rack 5 to further restrict the position of the piston 6. The photoelectric sensors are welded to the photoelectric limiting circuit board 8. The photoelectric sensors are used to sense the positions of the first limiting sensing hole 51 and the second limiting sensing hole 52 on the rack 5, and the position of the piston can be measured more accurately since it is possible for the photoelectric sensing mode to receive no interference from a magnetic or electric field outside.

In this embodiment, the photoelectric sensors, the support 3 and the gear set 4 are all located within the cuboid-shaped closed space formed by the top housing as well as the left side plate and the right side plate.

In another embodiment, the photoelectric sensors are located within the cuboid-shaped closed space formed by the top housing as well as the left side plate and the right side plate.

Due to the fact that the photoelectric sensors are located within the closed space, light from the outside does not interfere with photoelectric sensing and therefore, the photoelectric sensors are improved in their measurement accuracy.

Optionally, an overcurrent fault alarm buzzer is mounted on the motor. The motor fails to function normally if, during the process of sausage stuffing, meat that is not appropriately minced is present or normal squeezing for sausage stuffing cannot be performed owing to the entrainment of bones. At this time, the overcurrent fault alarm buzzer will sound an alarm by beeping, in order to prevent the motor from burning out.

Optionally, the hand crank may be connected with the first gear shaft 41 to drive the rack 5 to move up and down, and the hand crank may also be connected with the second gear shaft 42 to drive the rack 5 to move up and down. That is to say, in this embodiment, the motor is connected with the first gear shaft 41 to drive the rack 5 to move up and down in the case of automated operation, and yet under the circumstance of manual operation, the hand crank may be connected with the first gear shaft 41 or the second gear shaft 42, and is manually rolled to drive the rack 5 to move up and down.

Optionally, the first gear has a diameter smaller than that of the third gear, so that at the time of manual operation, slow operation occurs if the hand crank is connected with the first gear shaft 41, while fast operation arises from connection of the hand crank with the second gear shaft 42. And at the time of automated operation, speed adjustment is done by adjusting the rotating speed of the motor.

Optionally, switching between automated operation and manual operation is performed manually.

There are two types of operations when the sausage stuffer is in use: manual operation and automated operation.

During manual operation, the hand crank may be manually rolled to drive, via the gear set 4, the rack 5 to move downwards, the piston 6 is driven by the rack 5 to move downwards, and meat inside the barrel 7 is squeezed out of the outlet for meat and then stuffed into a casing to which the outlet for meat is connected. When the piston 6 is moved to the bottom of the barrel 7, all the meat inside the barrel 7 has been squeezed out, and either the barrel 7 needs to be cleaned up or addition of extra meat is required. In this case, the hand crank is manually rolled in a reverse direction to move the piston 6 upwards until the piston 6 is moved out of the open end of the barrel 7, and afterwards the barrel 7 is tilted, so that the barrel 7 is taken out.

During automated operation, the motor is energized to drive, via the gear set 4, the rack 5 to move downwards, the piston 6 is driven by the rack 5 to move downwards, and meat inside the barrel 7 is squeezed out of the outlet for meat and then stuffed into a casing to which the outlet for meat is connected. When the piston 6 is moved to the bottom of the barrel 7, all the meat inside the barrel 7 has been squeezed out, and either the barrel 7 needs to be cleaned up or addition of extra meat is required. The photoelectric sensors sense the positions of the rack 5 and the piston 6 through the first limiting sensing hole 51 on the top end of the rack 5, and transmit a lower-limit signal to the photoelectric limiting circuit board 8. The photoelectric limiting circuit board 8 transmits the lower-limit signal to an external control circuit, and 3 seconds later, the external control circuit controls the motor to rotate reversely, so that the piston 6 is moved upwards. When the piston is moved to the uppermost position, the photoelectric sensors sense the positions of the rack 5 and the piston 6 through the second limiting sensing hole 52 on the middle of the rack 5, and transmit an upper-limit signal to the photoelectric limiting circuit board 8. The photoelectric limiting circuit board 8 transmits the upper-limit signal to the external control circuit, and the external control circuit controls the motor to be powered off.

The present application further provides a control circuit for the sausage stuffer and a control method thereof.

Figure 7:
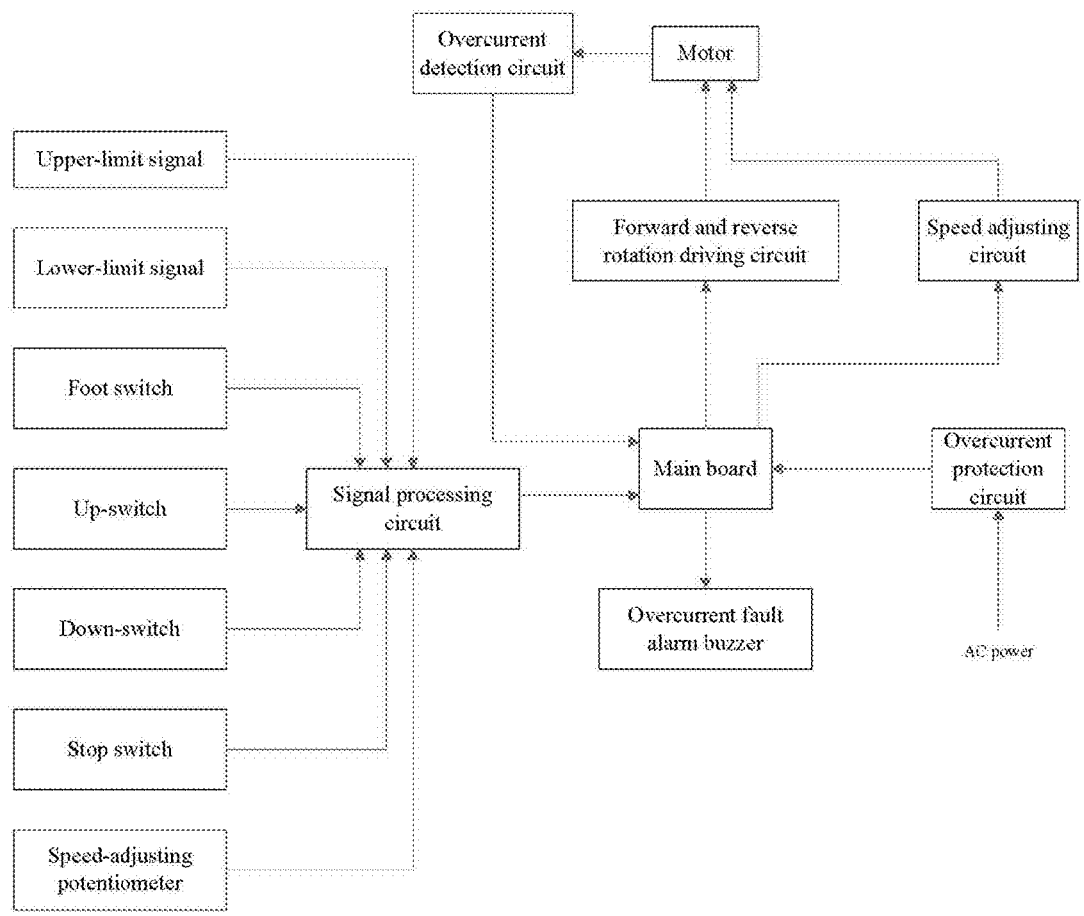
FIG. 7 is a schematic view of control circuit connection of the sausage stuffer of the present application.

As shown in FIG. 7, the control circuit for the sausage stuffer includes the photoelectric limiting circuit board 8, a signal processing circuit, a main board, a forward and reverse rotation driving circuit, a speed adjusting circuit, an overcurrent protector, the overcurrent fault alarm buzzer, an overcurrent detection circuit, the motor, and an input part.

The input part includes an up-switch, a down-switch, a stop switch, a foot switch, and a speed-adjusting potentiometer.

The photoelectric limiting circuit board 8 and the input part are separately connected to the signal processing circuit. The signal processing circuit, the forward and reverse rotation driving circuit, the speed adjusting circuit and the overcurrent fault alarm buzzer are separately connected to the main board. One end of the overcurrent protector is connected to a power supply while the other end is connected to the main board. The forward and reverse rotation driving circuit and the speed adjusting circuit are separately connected with the motor. One end of the overcurrent detection circuit is connected with the motor, while the other end is connected to the main board.

The control method includes regular control, overcurrent control and speed adjustment control processes.

At the time of regular operation, the down-switch or the foot switch is pressed to deliver a signal to the signal processing circuit. The signal processing circuit processes the signal and outputs the signal to the forward and reverse rotation driving circuit via the main board. The forward and reverse rotation driving circuit drives the motor to rotate in a forward direction, as the piston 6 is moved downwards until a lower-limit signal is delivered to the signal processing circuit; after that, the signal processing circuit outputs the signal to the forward and reverse rotation driving circuit after processing it via the main board. The forward and reverse rotation driving circuit drives the motor to rotate in a reverse direction, as the piston 6 is moved upwards until an upper-limit signal is delivered to the signal processing circuit. The signal processing circuit outputs a stop signal to the forward and reverse rotation driving circuit via the main board, the motor is controlled to stop operating. When operation of the motor needs to be stopped in the midway, the stop switch is pressed to transmit the stop signal to the signal processing circuit. The signal processing circuit processes and outputs the signal to the main board, the main board processes and outputs the signal to the forward and reverse rotation driving circuit, and the forward and reverse rotation driving circuit drives the motor to stop operating.

In case of overcurrent control, the overcurrent detection circuit detects an input current for the motor. The overcurrent detection circuit outputs a signal to the main board when the input current is larger than a limited current value. The main board outputs the signal to the forward and reverse rotation driving circuit, which controls the motor to stop operating; in the meantime, the main board outputs the signal to make the overcurrent fault alarm buzzer sound an alarm. At this moment, after the main board attains a fault signal from the overcurrent detection circuit, all the operating buttons for the up-switch, the down-switch, the foot switch and the speed-adjusting potentiometer no longer function normally. Resetting can be implemented by pressing the stop switch, and following this resetting, button operations can be restored; so, to prevent erroneous operations, the operator may press the up-switch subsequent to fault resetting. The piston 6 is automatically moved to the upper-limit end of the barrel 7, in which case the barrel 7 can be taken out to check whether abnormalities in sausage stuffing are caused by bones or non-minced meat.

If the overcurrent fault alarm buzzer encounters a fault, then alarm cannot be offered and overcurrent faults cannot be eliminated. At this moment, the overcurrent protector performs an automatic detection for the current, and the overcurrent protector acts to cut off the power automatically if the current value exceeds a preset overcurrent value, thus protecting the entire device.

In this embodiment, the preset overcurrent value is larger than the limited current value.

While speed-adjusting control, the speed-adjusting potentiometer transmits a speed-adjusting signal to the signal processing circuit, the signal processing circuit transmits the speed-adjusting signal to the main board, the main board transmits the speed-adjusting signal to the speed adjusting circuit, and the speed adjusting circuit outputs a voltage signal to implement speed adjustment by controlling the rotating speed of the motor.

In the speed-adjustable automatic limiting sausage stuffer provided in the present application, speed adjustment can be performed according to production needs, high-precision automatic limiting at positions in a vertical direction can be implemented, switching between manual operation and automated operation can be implemented, and it is convenient to mount and clean the barrel.

The description above is merely the preferred embodiments of the present application, but the scope of the present application is not limited to this. Any variation or substitution that could be easily conceived of by those skilled familiar with this art within the technical scope disclosed in the present application, shall be included within the scope of the present application.

What is claimed is:

1. A speed-adjustable, automatic limiting sausage stuffer, comprising:
    a hollow housing, comprising:
        an outer wall;
        a first end;
        a second end;
        an inner space;
        at least one meat inlet;
        and at least one meat outlet;
    a drive mechanism, at least partially disposed within the housing;
    a driveshaft, engaged with the drive mechanism to be driven forward or backward along a longitudinal axis that extends between the first and second ends of the housing;
    a barrel, detachably attached to the housing and disposed inside the housing;
    a piston, sealably engaging an inner surface of the barrel and fixedly attached to one end of the driveshaft;
    at least one photoelectric sensing board, disposed within the housing; and
    a photoelectric control assembly, receiving an input from the photoelectric sensing board and sending a control output to the drive mechanism based on the input from the photoelectric sensing board,
    wherein the driveshaft further comprises:
        a first hole, passing through the driveshaft in a transverse direction that is perpendicular to the longitudinal axis; and
        a second hole, passing through the driveshaft in a transverse direction that is perpendicular to the longitudinal axis,
    wherein the first and second holes on the driveshaft are arranged a predetermined longitudinal distance away from one another; and
    wherein when the driveshaft moves relative to the photoelectric sensing board such that the photoelectric sensing board senses one of the first and second holes, the photoelectric sensing board sends an input to the photoelectric control assembly, causing a control output to be sent to the drive mechanism.

2. The sausage stuffer of claim 1, wherein the photoelectric sensing board comprises at least one pair of sensors that are symmetrically disposed about an internal surface of the photoelectric sensing board such that when the first hole or the second hole on the driveshaft is located in a same plane as the photoelectric sensors, the at least one pair of symmetrically disposed photoelectric sensors and the first hole or the second hole lie in a straight line.

3. The sausage stuffer of claim 2, wherein the barrel extends from a first longitudinal height from the first end to a second longitudinal height from the first end, and the second longitudinal height is between the first hole and the second hole.

4. The sausage stuffer according to claim 3, wherein the first hole is disposed in a thickness direction of the driveshaft, the second hole is disposed in a width direction of the driveshaft, and the width direction is perpendicular to the thickness direction.

5. The sausage stuffer of claim 4, wherein the photoelectric sensing board comprises two pairs of sensors, and one of said pairs of sensors is disposed symmetrically on two sides of the driveshaft in the width direction of the driveshaft, and the other of said groups of sensors is disposed symmetrically on two sides of the driveshaft in the thickness direction of the driveshaft.

6. The sausage stuffer according to claim 5, wherein the drive mechanism comprises a motor attached to a gear set, wherein the gear set is fixed to the housing, and the gear set engages with the sensing drive shaft.

7. The sausage stuffer according to claim 6, wherein the piston comprises at least one groove that is formed on a side circumference of the piston, and an O-shaped ring is mounted within the groove such that the O-shaped ring forms a seal with the barrel when the piston is engaged with the barrel.

8. The sausage stuffer according to claim 7, wherein the gear set comprises an input shaft connected to the motor, and the input shaft comprises a first gear shaft and a second gear shaft, wherein the second gear shaft engages with the driveshaft.

9. The sausage stuffer according to claim 8, wherein:
    the first gear shaft is mounted on the housing near the first end of the housing, with one end stretching out of the housing;
    a first gear is disposed on a middle portion of the first gear shaft;
    the second gear shaft is parallel to the first gear shaft and mounted on the housing, with one end stretching out of the housing;
    a third gear is mounted on the second gear shaft;
    and the third gear engages with the first gear.

10. The sausage stuffer according to claim 9, further comprising a main board and an overcurrent fault alarm device, wherein:
    the overcurrent fault alarm device comprises an overcurrent detection circuit and an overcurrent fault alarm buzzer;
    the overcurrent detection circuit is separately connected with the motor and the main board; and
    the overcurrent fault alarm buzzer is connected with the main board.

11. The sausage stuffer according to claim 10, further comprising a speed-adjusting potentiometer, a signal processing circuit, and a speed adjusting circuit, wherein:
    the speed-adjusting potentiometer is connected with the signal processing circuit;
    the signal processing circuit is connected to the main board; and
    the speed adjusting circuit is connected between the main board and the motor.

12. The sausage stuffer according to claim 11, wherein the sausage stuffer is configured to automatically control timing, thickness, width, and height of sausages in a sausage stuffing process.

* * * * *